United States Patent [19]

Krishnakumar et al.

[11] Patent Number: 4,977,005
[45] Date of Patent: Dec. 11, 1990

[54] RIBBED PREFORM FOR USE IN THE BLOW MOLDING OF A PLASTIC MATERIAL CONTAINER

[75] Inventors: Suppayan M. Krishnakumar, Nashua, N.H.; Kenneth F. M. Friendship, Clarendon Hills, Ill.; Gautam K. Mahajan, Nashua, N.H.; John F. E. Pocock, Neu-Isenburg, Fed. Rep. of Germany

[73] Assignee: The Continental Group, Inc., Norwalk, Conn.

[21] Appl. No.: 97,603

[22] Filed: Nov. 27, 1979

[51] Int. Cl.⁵ ...................... B29C 49/06; B29D 23/00
[52] U.S. Cl. .................. 428/36.92; 215/1 C; 220/70; 220/72; 264/537; 428/542.8
[58] Field of Search ............ 428/35, 36, 542, 36.92, 428/542.8; 215/1 C; 220/70, 72; 264/535, 537, 538, 541

[56] References Cited

U.S. PATENT DOCUMENTS 3,137,748   6/1964   Makowski .......................... 264/537
3,900,120   8/1975   Sincock .
3,961,113   6/1976   Marco .............................. 428/36.92
4,005,245   1/1977   Edwards ........................... 428/542.8
4,151,249   4/1979   Lee .................................. 264/535 X

FOREIGN PATENT DOCUMENTS 882497   6/1943   France ................................ 264/537
1436468  3/1966   France ................................ 264/538

Primary Examiner—Jan H. Silbaugh
Assistant Examiner—Leo B. Tentoni
Attorney, Agent, or Firm—Charles E. Brown; Paul Shapiro; Charles A. Brown

[57] ABSTRACT

A champagne bottom plastic bottle having the bottom reinforced by internal radiating ribs which are formed by solid material. The bottle is formed in the customary manner by utilizing a preform which has molded on the inner surface thereof longitudinal ribs. The preform is formed by conventional injection molding equipment which has been modified only to form along the lower part of the customary core member longitudinally extending rib forming grooves.

1 Claim, 2 Drawing Sheets

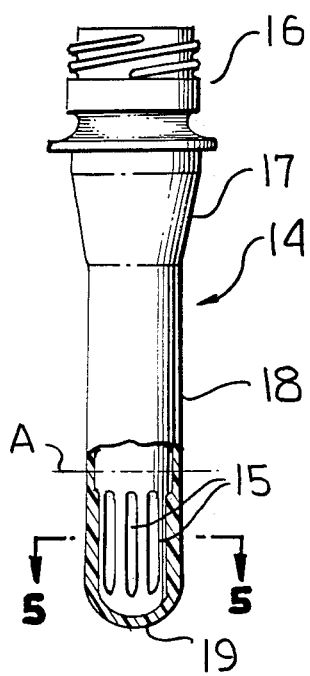
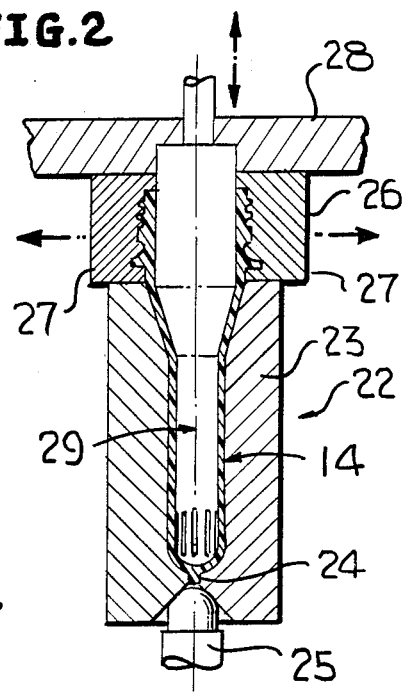
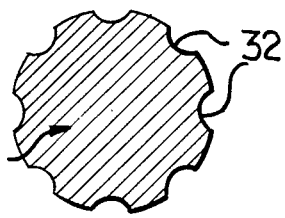
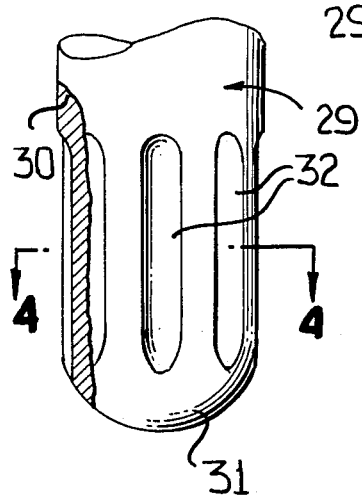
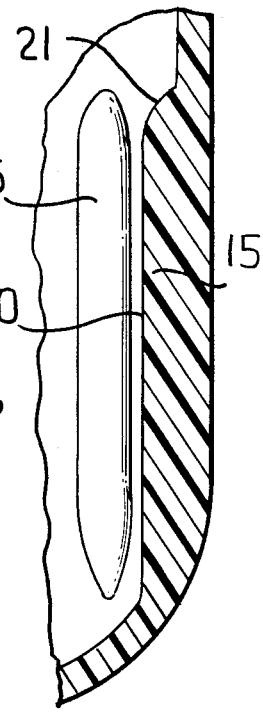

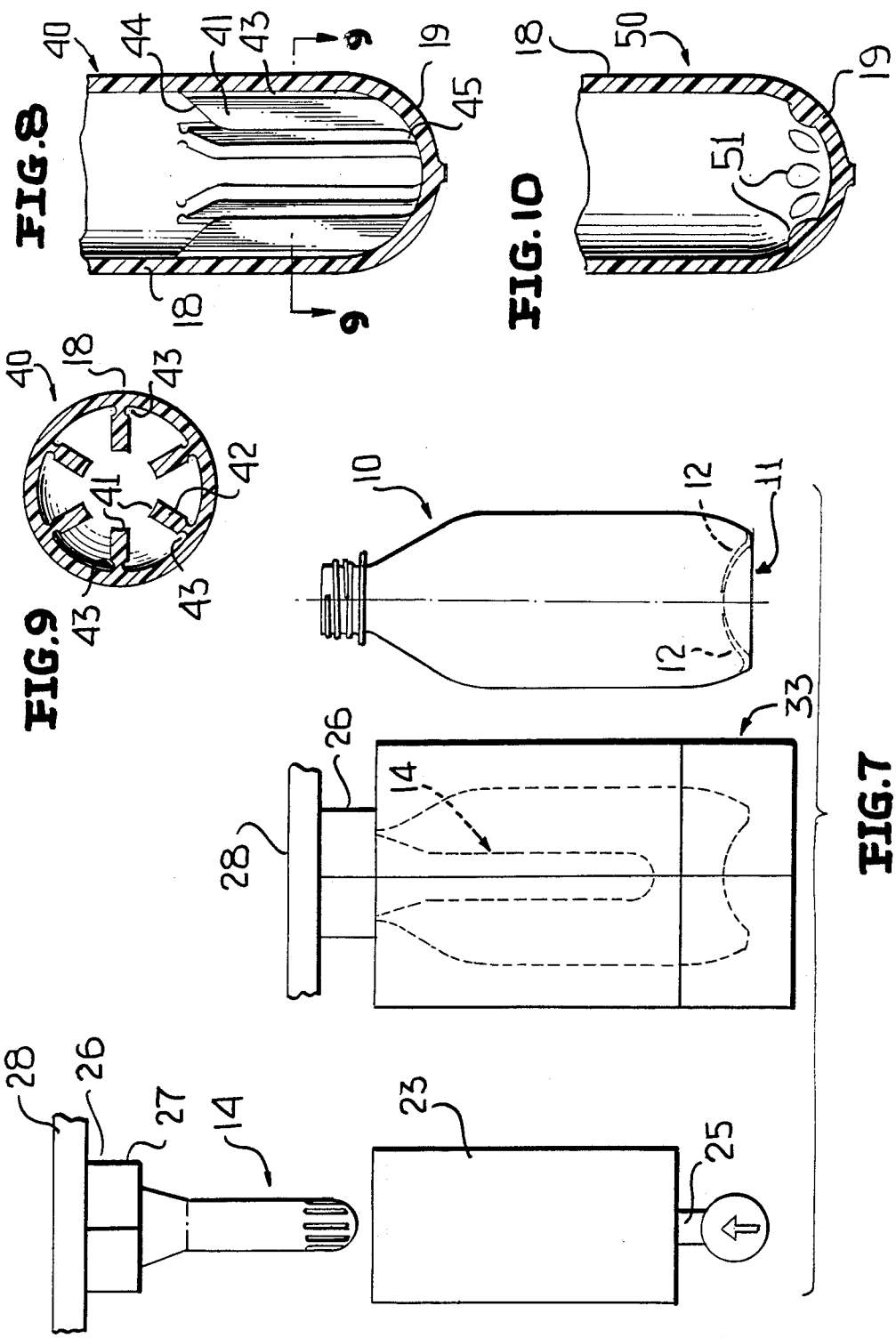

RIBBED PREFORM FOR USE IN THE BLOW MOLDING OF A PLASTIC MATERIAL CONTAINER

BACKGROUND OF THE INVENTION

This invention relates in general to new and useful improvements in blow molded bottles formed of a plastics material such as polyethylene terephthalate, or PET.

Most specifically, this invention relates to the formation of a bottle formed of a plastics material which is suitable for containing liquids under pressure such as carbonated beverages.

The bottling of carbonated beverages in plastics material bottles presents a number of problems, many of which arise in connection with the base or bottom structure of the bottle. The mere duplication in plastic of traditional glass bottle bottom configurations is unsatisfactory because of the tendency of plastic materials to creep or become distorted under pressure, especially in the presence of elevated temperatures which may be encountered curing, shipment and storage. Such distortions may alter the shape and dimensions of the traditional bottom configuration to the extent that the liquid level within the bottle falls below the normal fill line, thereby raising a question by a customer as to whether he is receiving full quantity. In addition, the bottom or base of the bottle may become distorted so as to become unstable when seated on a flat surface.

This invention most particularly related to a plastic material bottle intended to contain carbonated beverages under pressure wherein the bottom configuration is that of the so-called champagne bottle. While relatively successful champagne bottom plastic material bottles have been produced which are acceptable to the public, such bottoms still have a tendency to creep, particularly when the available material is held to a minimum. It is therefore proposed in accordance with this invention to reinforce or stiffen the bottom structure by using a minimum of additional plastic material, the stiffening being in the form of radiating ribs which are in the form of added solid material disposed internally of the bottle.

It has been found that the required rib arrangement can be formed on the bottle bottom by the simple formation of ribs on the lower portion of the preform from which the bottle is blow molded.

Further, it has been found that the necessary ribs can be readily formed on the preform by machining grooves in existing mold core members. Therefore, in accordance with this invention, it has been found that the necessary preform can be readily formed with a minor change in existing equipment and that, further, the desired rib reinforced bottom bottle can be formed utilizing the same equipment as heretofore utilized in the forming of an identical bottle but without the stiffening ribs.

The axial extent of the ribs may be varied and, when a minimum of reinforcement is desired, the ribs may be substantially entirely on the hemispherical bottom part of the preform and located so that when the preform is blown into a bottle the ribs will be primarily at the reverse turn between the generally cylindrical outer part of the bottom and the upwardly and inwardly directed bottom portion.

On the other hand, the ribs may be quite pronounced on the preform and extend further radially inwardly adjacent the extreme bottom of the preform so that in the blown bottle the ribs are rather pronounced and extend almost to the center of the bottom. In such event, the ribs may have a beneficial effect on the filling of the bottle in that they will control the swirling of the liquid as it is directed against the bottom portion of the resultant bottle.

Much effort has been devoted in the past to the reinforcement or stiffening of a champagne bottom bottle. Typical examples of the prior art efforts are found in the patent to Chang U.S. Pat. No. 4,134,510 and Krishnakumar et al U.S. Pat. No. 4,108,324, both of which patents relate to the reinforcement or stiffening of a champagne bottom bottle by the provision of ribs which require relatively complex molds and wherein all of the rib formations are disposed externally of the bottle and therefore do not present a smooth outer surface on the bottom of the bottle as is desired to provide a stable base.

With the above and other objects in view that will hereinafter appear, the nature of the invention will be more clearly understood by reference to the following detailed description, the appended claims, and the several views illustrated in the accompanying drawings.

BRIEF DESCRIPTION OF THE DRAWINGS

FIG. 1 is an elevational view of a preform for forming bottles in accordance with this invention, a lower portion of the preform being broken away and shown in section.

FIG. 2 is a vertical sectional view on a smaller scale, showing the manner in which the preform of FIG. 1 is formed by injection molding.

FIG. 3 is an enlarged fragmentary elevational view of the lower portion of a mold core member especially configurated for forming internal ribs on the preform, a portion of the core member being broken away and shown in section to illustrate the details of rib forming grooves formed therein.

FIG. 4 is a transverse sectional view taken generally along the line 4—4 of FIG. 3, and shows the groove arrangement in the core member.

FIG. 5 is an enlarged transverse sectional view taken generally along the line 5—5 of FIG. 1, and shows the internal rib arrangement in the preform.

FIG. 6 is an enlarged fragmentary vertical sectional view taken generally along the line 6—6 of FIG. 5, and shows the specific internal rib configuration.

FIG. 7 is a schematic view showing the manner in which a champagne bottom bottle is formed in accordance with this invention using the preform of FIG. 1.

FIG. 8 is a vertical sectional view taken through the lower portion of a modified form of preform, and shows the general rib construction thereof.

FIG. 9 is a transverse full horizontal sectional view taken generally along the line 9—9 of FIG. 8, and shows the specific details of the ribs.

FIG. 10 is a sectional view similar to FIG. 8, and shows a preform with still a further rib formation.

DESCRIPTION OF THE PREFERRED EMBODIMENTS

This invention is specifically directed to the formation of a blow molded bottle 10 which is formed of a suitable plastic material. The bottle 10 is generally illustrated in FIG. 7, and is provided with a recessed champagne bottom 11. The champagne bottom 11 is provided with radially extending stiffening or reinforcing ribs 12 which are solid and project inwardly from the inner surface of the bottom 11.

This invention most particularly relates to the provision of a simple preform for forming the bottle 10, the preform being identified by the numeral 14 and being specifically illustrated in FIG. 1. The preform 14 is of a conventional configuration for forming a champagne bottom bottle except for the provision of internal ribs 15 which are circumferentially spaced and which extend longitudinally of the preform. Most specifically, the preform 14 includes an upper neck finish 16, a tapering upper portion 17, and a cylindrical lower portion 18 which terminates in a closed end 19 which normally will be of a hemispherical configuration.

FIG. 1 has been provided with an imaginary line A below which that part of the preform 14 serves to form the bottom 11 of the bottle 10. It is to be noted that the ribs 15 are primarily formed on the lower part of the lower tubular portion 18 and are disposed in their entirety below the line A.

As is best shown in FIG. 5, each of the ribs 15 is integrally formed with the tubular portion 18 and projects radially inwardly from the inner surface thereof. Further, each of the ribs 15 is in the form of an arcuate section.

Referring now to FIG. 6, it will be seen that each rib 15 has an innermost surface 20 which is parallel to the longitudinal axis of the preform 14. Each rib 15 terminates in the closed end 19 by blending therewith in a natural transition due to the curvature of the closed end 19. The upper end of each rib 15 terminates in a rounded end portion 21 which is rounded longitudinally, as shown in FIG. 6, and is rounded transversely in view of the natural curved section of the rib 15.

The preform 14 is injection molded within a mold assembly generally identified by the numeral 22. The mold assembly, except for a minor change therein, is the same mold assembly which has been utilized in the past for forming preforms suitable for the formation of champagne bottom bottles.

The mold assembly includes a cavity defining mold member 23 which has a sprue passage 24 opening into the lower end thereof, whereby plastic material may be introduced thereinto through a nozzle arrangement 25.

The upper end of the cavity defined by the mold member 23 has a continuation defined by a split neck mold assembly 26 which includes a pair of neck mold members 27. The neck mold members 27 are carried by a suitable mounting plate 28 which also functions as a support for the mold core member, generally identified by the numeral 29.

The mold core member 29 is of a configuration as is customarily provided for use in conjunction with the neck mold assembly 26 and the mold member 23. However, there has been a simple modification of the core member 29.

Referring now to FIGS. 3 and 4, it will be seen that the core member 29 includes a lower portion 30 which is of a constant circular cross section and which terminates in a generally spherical lower end 31. The core member 30 has been modified by the simple machining of rib forming grooves which are circumferentially spaced about the part 30 and which extend down into and terminate within the end part 31. It will be seen that the grooves 32 are of a constant depth and are formed by merely machining the core member 29 starting at the bottom end thereof and continuing until the grooves 32 are of the desired height or longitudinal length. The grooves 32 may be conventionally formed by means of a simple milling cutter.

It will be readily apparent from FIG. 2 that the preform 14 may be injection molded within the mold assembly 22 in a conventional manner. After the injection molding has been completed, the core member 29 is moved longitudinally relative to the fixed mold member 23 in the general direction of the arrow B so as to strip the preform 14 from the mold member 23.

It is to be understood that once the preform 14 has been formed, it may either be transferred to a blow mold while remaining on the core member 29, or it may be stripped from the core member 29 and later associated with a blow mold for molding into the desired bottle. It will be readily apparent that since the grooves 32 are disposed with their bottoms parallel to the longitudinal axis of the core member 29 and since they open through the lower end 31 of the core member 29 without any reduction in cross section, the preform 14 may be readily stripped from the core member 29 by a relatively longitudinal movement.

Referring now to FIG. 7, it will be seen that the preform 14 is formed by injection molding in the manner illustrated in FIG. 2. Thereafter, the preform is either transferred to a blow mold 33 while still on the core member 29, or by a separate support means (not shown). The blow mold 33 is preferably a split mold. However, the blow mold 33 is a conventional mold for forming a champagne bottom bottle which would be identical to the bottle 10 but without the internal reinforcing or stiffening ribs 12. The preform 14 is blow molded within the blow mold 33 in the customary manner to form the bottle 10. The bottle 10 is thereafter removed from the blow mold 33 and stripped from the carrier.

Reference is now made to FIGS. 8 and 9 wherein a modified form of preform is illustrated, the preform being generally identified by the numeral 40. The preform 40 is of the same general construction as the preform 14 and is modified only with respect to the formation of ribs on the interior thereof. In lieu of the ribs 15, the cylindrical lower portion 18 and hemispherical closed end 19 will be provided with ribs 41 which are much more pronounced than the ribs 14 and generally will be six in number instead of the illustrated eight of the preform 14. As is best shown in FIG. 9, as compared to FIG. 5, the ribs 41 are generally rectangular in cross section and extend more than 25% of the diameter of the cylindrical body portion 18. Further, at their line of joining to the cylindrical body portion 18, the ribs 41 are reduced in thickness as at 42 by shallow grooves 43 formed on opposite faces thereof.

The ribs 41 further differ from the ribs 15 in that, in lieu of having simple rounded upper ends, the ribs 41 have definitely sloping upper ends 44. The ribs 41 also do not terminate directly into the hemispherical closed end 19, but have radially inwardly curved lower portions 45.

The ribs 41 serve the same function as the ribs 15, but require more material. The ribs will provide a much greater reinforcement. Further, the ribs in the final bottle (not shown) will project upwardly on the inner surface of the bottle bottom sufficiently to affect the flow of a liquid being placed into the bottle so as to reduce the turbulence of the liquid being filled into the bottle and thus greatly facilitate the filling process.

In FIG. 10 there is illustrated yet another form of preform generally identified by the numeral 50. The preform 50 is also of a configuration similar to the preform 14 and differs therefrom only in the configuration of internal ribs 51. The ribs 51 are relatively short as compared to the ribs 15 and are so configurated and positioned wherein, when the preform 50 is formed into a bottle, the ribs 51 will be in the area of the return bend between the generally cylindrical outer portion of the bottom and the radially inward and upward portion of the bottom, which area is generally the weakest part of the bottle and wherein inverting of the bottom under pressure would begin.

The ribs 51 are of a rounded cross section as are the ribs 15 and are formed in the illustrated embodiment of FIG. 10 entirely on the inner surface of the hemispherical closed end 19.

Although it has not been so illustrated, it is feasible to place the ribs 51 on the external surface of the preform, although this would require remachining of the preform mold as opposed to a minor remachining of the preform core.

Although only a preferred embodiment of the preform construction and the mode of making the same and utilizing the same has been specifically illustrated and described, it is to be understood that minor variations may be made in the preform and the resultant bottle without departing from the spirit and scope of the invention as defined by the appended claims.

what is claimed as new is:

1. A preform for use in the blow molding of a plastic material container having an internal reinforcing rib arrangement, said preform being formed of a plastic material and including a tubular lower portion terminating in a closed end, and an arrangement of longitudinally extending ribs integrally formed on the inner surface of said tubular lower portion, each of said ribs being of a reduced thickness at its line of juncture with the remainder of the preform.

* * * * *